United States Patent [19]

Ota

[11] Patent Number: 4,754,350
[45] Date of Patent: Jun. 28, 1988

[54] DISK CLAMPING DEVICE

[75] Inventor: Shunji Ota, Furukawa, Japan

[73] Assignee: Alps Electric Co., Ltd., Japan

[21] Appl. No.: 900,497

[22] Filed: Aug. 26, 1986

[30] Foreign Application Priority Data

Aug. 29, 1985 [JP] Japan ............................ 60-132973[U]

[51] Int. Cl.$^4$ ................................................. G11B 3/62
[52] U.S. Cl. ....................................... 360/97; 369/270
[58] Field of Search ........................... 360/97, 99, 133; 369/270

[56] References Cited

U.S. PATENT DOCUMENTS

| | | | |
|---|---|---|---|
| 4,125,883 | 11/1978 | Rolph | 360/99 |
| 4,413,294 | 11/1983 | Beijer | 360/99 |
| 4,575,837 | 3/1986 | Okita | 360/99 X |

Primary Examiner—John H. Wolff
Attorney, Agent, or Firm—Guy W. Shoup

[57] ABSTRACT

A disk clamping device for centering and clamping a disk, for disk recording an reproducing apparatus, which comprises: a wheel for holding a disk thereon, rotatably supported on the frame of the disk recording and reproducing apparatus; and a hub rotatably and axially moveably supported on a frame so as to be moved toward or away from the wheel for disk clamping or disk unclamping operation. The hub has a plurality of radial arms arranged at regular angular intervals along the periphery thereof. A pressing part is provided at the outer end of each radial arm. The pressing part has a pair of pressing surfaces formed at the opposite ends of the underside thereof and a pair of disk guides depending from the opposite ends of the inner edge thereof. The circumferential position of the pressing surfaces coincides with that of the corresponding disk guides, so that the radial arm will never be twisted when the hub is pressed against the wheel to clamp a disk therebetween, by reaction forces exerted thereto through the pressure surfaces and the corresponding disk guides by the wheel.

3 Claims, 4 Drawing Sheets

DISK CLAMPING DEVICE

BACKGROUND OF THE INVENTION

1. Field of the Invention:

The present invention relates to a disk recording and reproducing apparatus employed in electronic computers and word processors for recording information in a disk and reproducing the recorded information and, more specifically, to a disk clamping device for such a disk recording and reproducing apparatus, for clamping and rotating a disk.

2. Description of the Prior Art:

A conventional disk clamping device is shown in FIG. 2. The constitution of the disk clamping device will be described with reference to FIG. 2.

A spindle 2 to be driven by a motor, not shown, is supported in bearings 3 on a housing 1. A wheel 4 is fixed to the upper end of the spindle 2. A circular recess 4a is formed in the central portion of the wheel 4 coaxially with the spindle 2. The diameter of the circular recess 4a is substantially the same as the diameter of a central hole, not shown, of a flexible disk 5 to be placed on the upper surface 4b of the wheel 4. A frame 6 is swingable in a vertical plane toward and away from the wheel 4. A hole 6a is formed in the frame 6. An arbor 7 having a diameter smaller than that of the hole 6a is received loosely in the hole 6a so as to be radially movable in the hole 6a. A stopper 8 fitted on the upper end of the arbor 7 is seated on the upper surface of the frame 6 with a washer 9 therebetween to retain the arbor 7 in place on the frame 6. A hub 11 is supported on a bearing 10 on the arbor 7 at the lower end of the same.

The hub 11 is formed by molding a synthetic resin in a unitary construction. A central hole 12 is formed in the boss of the hub 11. The bearing 10 is fitted in forced fit in the central bore 12 and is seated on the upper surface of an annular protrusion 13 formed in the inner surface of the central bore 12 in the lower part of the same. The arbor 7 is connected to the hub 11 with the upper surface of a flange 7a formed at the lower end thereof, in contact with the lower surface of the annular protrusion 13. Radial arms 14 are formed in the peripheral portion of a flange formed at the upper end of the boss of the hub 11. The outer end of each arm 14 is bent downward and is joined to a pressing part 15. A pressing surface 15a is formed in the lower surface of the pressing part 15. A plurality of pairs of flexible disk guides 16 having a comparatively small wall thickness are formed at regular angular intervals so as to depend from the pressing parts 15. Each disk guide 16 has a vertical positioning wall 17 projecting vertically and downward from the pressing part 15 and an inclined guide wall 18 extending inward from the lower end of the positioning wall 17. FIG. 6 is a detail view of the radial arm 14 and the associated parts of the hub 11. The pressing parts 15 and the positioning walls 17 are arranged alternately, and hence the angular position of the pressing parts 15 is different from that of the positioning walls 17. The diameter $D_1$ of a circular cylinder containing the respective outer surfaces of the positioning walls 17 is slightly greater than the diameter $D_2$ of the circular recess 4a of the wheel 4. Accordingly, when the hub 11 is fitted in the recess 4a of the wheel 4, the disk guides 16 are elastically deformed so that the positioning walls 17 of the disk guides 16 are in close contact with the inner surface of the circular recess 4a. A compression coil spring 19 is interposed between the bearing 10 fixedly fitted in the bore 12 of the hub 11 and the inner surface of the frame 6.

The manner of operation of this conventional disk clamping device will be described hereinafter.

In the initial state, the frame 6 is raised to an upper position by a spring, not shown, as illustrated in FIG. 2. The hub 11 is pressed at the annular protrusion 13 formed in the bore 12 against the flange 7a of the arbor 7 by the compression coil spring 19.

After the disk 5 has been inserted through the disk inlet, not shown, of the disk recording and reproducing apparatus into the disk recording and reproducing apparatus as far as the central hole of the disk 5 is located above the circular recess 4a of the wheel 4, the frame 6 is turned downward manually or by suitable means in a direction indicated by an arrow A to move the hub 11 toward the wheel 4. Then, first the lower ends of the guiding walls 18 of the hub 11 enter the circular recess 4a of the wheel 4 through the central hole of the disk 5. While the guiding walls 18 of the hub 11 move into the circular recess 4a of the wheel 4, the guiding walls 18 engage the boundary of the central hole of the disk 5 to move the disk 5 in a radial direction. When the arbor 7 is dislocated from the correct position corresponding to the spindle 2, the arbor 7 is brought into alignment with the spindle 2 through the engagement of the guiding walls 18 and the inner circumference of the wheel 4. Thus, the disk 5 is moved laterally by the guiding walls 18 of the hub 11 as the hub 11 is lowered toward the wheel 4 so that the center thereof approaches the center axis of the spindle 2 gradually for temporary alignment. Since the diameter $D_1$ of the positioning walls 17 is slightly greater than the diameter $D_2$ of the circular recess 4a of the wheel 4, the positioning walls 17 are bent elastically by the inner circumference of the wheel 4 when the positioning walls 17 enter the circular recess 4a, while the disk 5 is brought into alignment with the circular recess 4a by the positioning walls 17. Thus, the disk 5 is positioned correctly on the wheel 4. As the hub 11 is lowered further, the pressing surfaces 15a of the pressing parts 15 press the disk 5 against the upper surface 4b of the wheel 4, and then the downward movement of the hub 11 is stopped temporarily. Then, the hub 11 is lowered further compressing the compression coil spring 19, whereby the pressing parts 15 apply the pressure of the compression coil spring transmitted thereto through the radial arms 14 to the disk 5 to secure the disk 5 on the upper surface 4b of the wheel 4. Uppon the arrival of the frame 6 at the lowermost position, the frame 6 is stopped to complete the disk centering and clamping operation.

After the downward movement of the frame 6 has been stopped, the spindle 2 is driven to rotate the disk 5 and a magnetic head, not shown, disposed opposite to the recording surface of the disk 5 write information in the disk 5 or read the information recorded in the disk 5 from the disk 5.

In discharging the disk 5 outside the disk recording and reproducing apparatus, the frame 6 is turned upward, and then the hub 11 is restored to the initial position by the resilience of the compression coil spring 19.

However, this conventional disk clamping mechanism has the following drawbacks. Since the pressing parts 15 and the disk guides 16 of the hub 11 are arranged alternately at angular intervals, the point of action of a reaction force exerted by the wheel 4 on each positioning wall 17 and the point of action of a reaction force exerted by the wheel 4 on the adjacent pressing part 15 are not on the same radial line when the hub 11 engage the wheel 4 firmly, and hence the reaction force exerted on the pressing parts 15 and the reaction force exerted on the disk guides 16 tend to twist the radial arms 14. Consequently, the disk 5 held between the pressing surfaces 15a of the hub 11 and the upper surface 4b of the wheel 4 tends to slip relative to the wheel 4 when the wheel 4 is rotated, and hence the disk 5 is unable to be rotated at a predetermined revolving rate. Therefore, correct writing or reading of information is impossible and the disk 5 is liable to be damaged when the same is clamped unsteadily and rotated irregularly.

SUMMARY OF THE INVENTION

Accordingly, it is an object of the present invention to provide a disk clamping device for disk recording and reproducing apparatus, capable of firmly clamping a disk so that the disk is rotated together with the wheel at a regular revolving rate without slipping relative to the wheel.

The object of the invention is achieved by a disk clamping device which centers and clamps a disk (5) with a wheel (4) rotatably supported on the frame of a disk recording and reproducing apparatus and a hub (11) vertically moveably supported above the wheel (4), in which two separate pressing surfaces (20a) are formed at the opposite ends of a pressing part (20) so that the pressing surfaces (20a) and the respective positioning walls (17) of a pair of disk guides (16) are aligned with the same radii of the hub (11), respectively.

In this configuration, when the disk (5) is clamped between the wheel (4) and the hub (11), the point of action of a reaction force exerted on the pressing surface (20a) by the upper surface of the wheel (4) and the point of action of a reaction force exerted on the positioning wall (17) of the corresponding disk guide (16) are on the same radius of the hub (11), and hence the radial arm (14) will not be twisted and the hub (11) is able to hold the disk (5) firmly in place even when the load on the hub (11) varies during rotation, and thereby the disk (5) is rotated stably without slipping relative to the wheel (4).

The above and other objects, features and advantages of the present invention will become more apparent from the following description of a preferred embodiment thereof taken in conjunction with the accompanying drawings.

BRIEF DESCRIPTION OF THE DRAWINGS

In FIGS. 1 to 6, like reference characters designate like or corresponding parts throughout.

DESCRIPTION OF THE PREFERRED EMBODIMENTS

Figure 1:
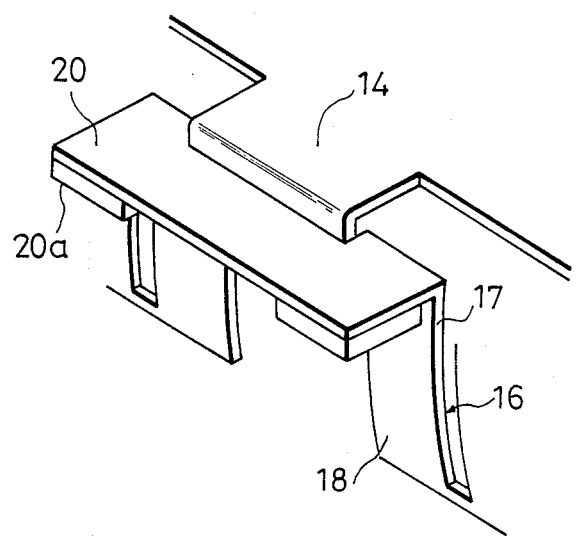
FIG. 1 is a perspective view of the raidal arm and the associated parts of a disk clamping device, in a preferred embodiment, according to the present invention.
Figure 2:
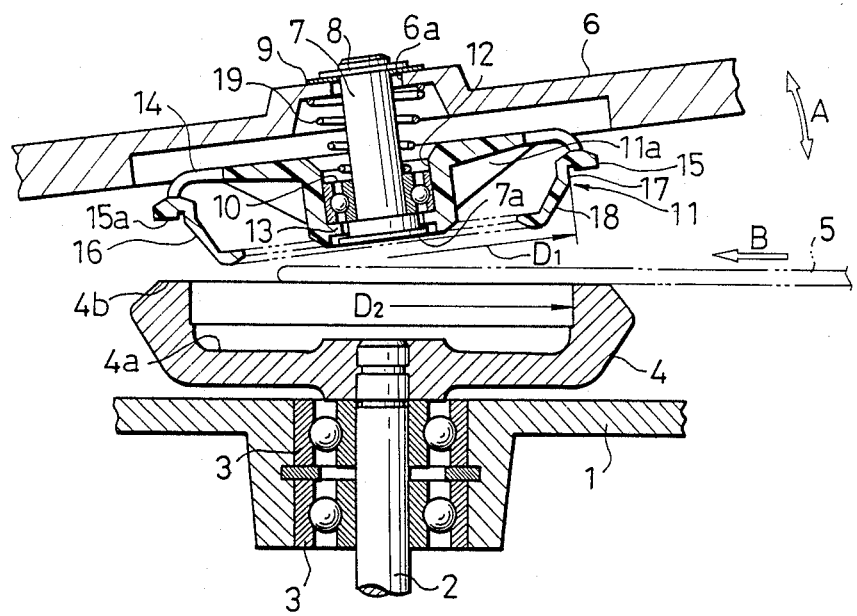
FIG. 2 is a sectional view of a conventional disk clamping device, in which a disk is being inserted between the wheel and the hub for clamping.
Figure 3:
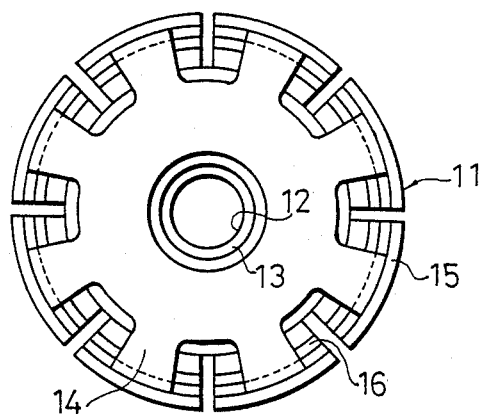
FIG. 3 is a top plan view of the hub of the disk clamping device of FIG. 2.
Figure 4:
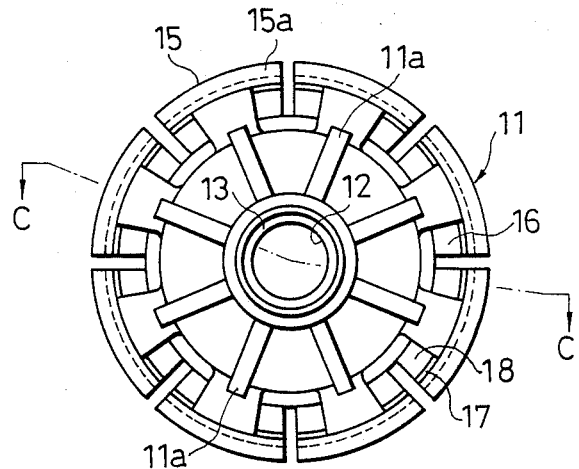
FIG. 4 is a bottom plan view of the hub of the disk clamping device of FIG. 2.
Figure 5:
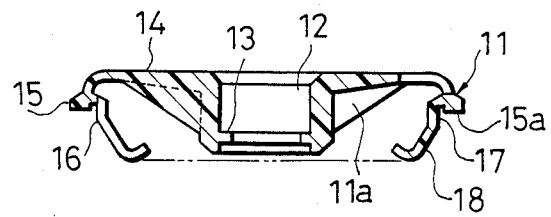
FIG. 5 is a sectional view taken on line C—C in FIG. 4.
Figure 6:
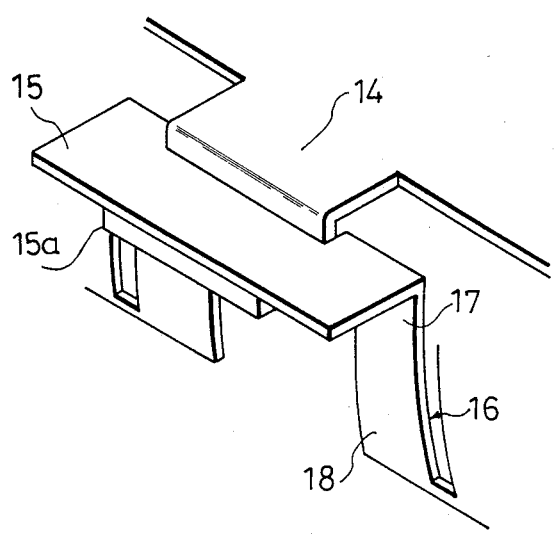
FIG. 6 is a perspective view of the radial arm and the associated parts of the hub of the disk clamping device of FIG. 2.

A disk clamping device, in a preferred embodiment, according to the present invention will be described hereinafter with reference to FIG. 1. However, since the general configuration and functions of the disk clamping device according to the present invention, except part of the hub, are the same as those of the above-mentioned conventional disk clamping device shown in FIGS. 2 to 6, the description of those in the preferred embodiment which are the same as the conventional disk clamping device will be omitted to avoid duplication.

The disk clamping device according to the present invention also has a wheel 4 and a hub 11 for centering and clamping a disk 5 therebetween.

The construction and disposition of the wheel 4 are entirely the same as those of the conventional disk clamping device.

The hub 11 is supported on a frame 6 in the same manner as that of the conventional disk clamping device. The hub 11 is formed by molding a synthetic resin in a unitary construction and has a plurality of raidal arms 14 formed so as to project from the periphery of a flange extending from the upper end of the boss of the hub 11 at regular angular intervals. A pressing part 20 is formed at the outer end of each radial arm 14. The pressing part 20 is provided at the opposite ends of the underside thereof with a pair of pressing surfaces 20a as illustrated in FIG. 1. A pair of flexible disk guides 16 extend downward from the inner edge of the pressing part 20. The circumferential position of the flexible disk guides 16 coincides with that of the pressing surfaces 20a of each pressing part 20. That is, a pair of the pressing surfaces 20a and a pair of the flexible disk guides 16 of each pressing part 20 are contained in the same radial vertical planes, respectively. Each flexible disk guide 16 has a positioning wall 17 depending vertically downward from the inner edge of the pressing part 20 and an inclined guiding wall 18 extending inward from the lower end of the positioning wall 17.

When a disk 5 is clamped between the wheel 4 and the hub 11, the disk 5 is centered correctly by the positioning walls 17 of the flexible disk guides 16 and is pressed firmly on the upper surface 4b of the wheel 4 by the pressing surfaces 20a of the pressing parts 20 of the flexible disk guides 16. Since the circumferential position of the disk guide 16 is the same as that of the corresponding pressing surfaces 20a, the reaction force exerted on the disk guides 16 by the wheel 4 and the reaction force exerted on the corresponding pressing surfaces 20a are contained in the same radial vertical plane. Therefore, the radial arms 14 are never twisted by those reaction forces. Thus the disk 5 is clamped firmly between the wheel 4 and the hub 11 and is rotated stably at a regular revolving rate without slipping relative to the wheel 4, when the wheel 4 is rotated.

Although the invention has been described in its preferred embodiment with a certain degree of particularity, it is to be understood that many changes and variations are possible in the invention without departing from the scope and spirit thereof.

What is claimed is:

1. A disk clamping device for centering and clamping a disk, for recording and reproducing apparatus, comprising: a wheel rotatably supported on the housing of a recording and reproducing apparatus so as to be driven for rotation by rotative driving means; a hub rotatably and axially moveably supported above the wheel so as to be moved toward or away from the wheel, said hub having a plurality of radial arms arranged at regular angular intervals along the periphery thereof, a plurality of pressing parts provided at the respective outer ends of the radial arms, respectively, each of said pressing parts having a pair of pressing surfaces formed at opposite ends radially spaced apart on the underside thereof, and a pair of flexible disk guides formed so as to depend from the inner edge of each pressing part and each having a positioning wall extending vertically downward from the inner edge of the pressing part and an inclined guiding wall extending inward from the lower end of the positioning wall; and the circumferential position of each disk guide coinciding in radial position with that of each corresponding pressing surface of each pressing part.

2. A disk clamping device according to claim 1, wherein said hub is formed by molding a synthetic resin in a unitary structure.

3. A disk clamping device according to claim 1, wherein the radial arms are flexible.

* * * * *